United States Patent
König et al.

[11] Patent Number: 5,984,285
[45] Date of Patent: Nov. 16, 1999

[54] PLASTIC SPRING

[75] Inventors: Helmuth König, St. Valentin; Günther Leitner, Marchtrenk, both of Austria

[73] Assignee: Haas Beteiligungsgesellschaft m.b.H., Traun, Austria

[21] Appl. No.: 08/860,104

[22] PCT Filed: Dec. 21, 1995

[86] PCT No.: PCT/AT95/00248

§ 371 Date: Jun. 17, 1997

§ 102(e) Date: Jun. 17, 1997

[87] PCT Pub. No.: WO96/21111

PCT Pub. Date: Jul. 11, 1996

[30] Foreign Application Priority Data

Dec. 30, 1994 [AT] Austria ........................... 2430/94

[51] Int. Cl.⁶ ........................................ F16F 1/18
[52] U.S. Cl. ............................... 267/158; 267/164
[58] Field of Search .................... 267/158 OR, 160, 267/162, 164; 221/271, 276, 279, 299

[56] References Cited

U.S. PATENT DOCUMENTS

| | | | |
|---|---|---|---|
| 2,845,748 | 8/1958 | Derham | 267/164 |
| 3,319,827 | 5/1967 | Englesson | 221/299 |
| 3,730,509 | 5/1973 | Jorn | 267/152 |
| 5,226,634 | 7/1993 | Rudy, Jr. et al. | 267/158 |
| 5,746,418 | 5/1998 | Jansen | 267/158 |

FOREIGN PATENT DOCUMENTS

| | | |
|---|---|---|
| 0 199 900 | 11/1986 | European Pat. Off. . |
| 0 600 123 | 6/1994 | European Pat. Off. . |
| 2089650 | 1/1972 | France . |
| 2194897 | 3/1973 | France . |
| 60147353 | 8/1985 | Japan . |

*Primary Examiner*—Robert J. Oberleitner
*Assistant Examiner*—Thomas J. Williams
*Attorney, Agent, or Firm*—Collard & Roe, P.C.

[57] ABSTRACT

A plastic spring consists essentially of a spring support, a web rigidly supported on the spring support, a first spring tongue attached to the web, and at least one auxiliary spring tongue extending from the web between the first spring tongue and the spring support, the spring tongues being parallel to each other. The spring characteristic of such a plastic spring may be adapted to different conditions independently of the material.

4 Claims, 1 Drawing Sheet

PLASTIC SPRING

BACKGROUND OF THE INVENTION

1. Field of the Invention

This invention relates to a plastic spring, consisting of a spring tongue attached to a spring support by means of a web.

2. Description of the Prior Art

Plastic springs can be used for many purposes, and they are employed for instance in tablet dispensers as a return spring for the tablet ejector. These plastic springs are mostly injection-molded in one single operation together with the spring support, and up to now have consisted of a bow-shaped web ending as a spring tongue at its free end. For safety reasons a material must be chosen for the production of the plastic spring and the spring support, which in case of rupture does not involve a risk of injury by sharp edges, pointed parts or the like, so that the material properties of the used plastic material cannot be adjusted to the required spring properties. Therefore, the known plastic springs are often too weak and cannot satisfy the requirements as regards the spring deflection and the spring force.

SUMMARY OF THE INVENTION

It is thus the object underlying the invention to eliminate these deficiencies and create a plastic spring as described above, which can easily be injection-molded from the same material as the associated spring support, and whose spring properties can nevertheless easily be adapted to different conditions.

This object is solved by the invention in that the web is rigidly supported with respect to the spring support, and at least one auxiliary spring tongue parallel to the spring tongue extends from the web below the spring tongue. The spring tongue and auxiliary spring tongues constitute a cooperating spring assembly, whose spring force increases the more spring is deflected, since the deflecting spring tongue is supported by the underlying auxiliary spring tongue under a load then to and then to the spring force of the auxiliary spring tongue is added to the spring force of the spring tongue. This increase in spring force can be adjusted to the desired conditions by the number of auxiliary spring tongues, and the extent of the deflection may be influenced by means of the distance between the spring tongue and auxiliary spring tongue. The plastic spring can therefore be injection-molded from a suitable material which is break-proof even under higher loads, the dangerous point of attachment of the web is secured by rigidly supporting the web on the spring support.

When the spring tongue and the auxiliary spring tongues have a length which decreases towards the spring support, the stiffness increasing with decreasing length results in a progressive increase in spring force with increasing deflection of the spring, and there is in addition achieved a space-saving arrangement of the auxiliary spring tongues below the spring tongue.

For properly utilizing the material properties, the spring tongue and the auxiliary spring tongues have a width tapering towards the free end of the tongue, so that the material stresses can be uniformly distributed over the length of the tongue when a load is acting on the spring.

It is also advantageous to provide lateral supporting cheeks between web and spring support, as these supporting cheeks do not only provide stability of the web support, but a protective housing is formed between the supporting cheeks and the web for the spring tongue and the auxiliary spring tongues.

BRIEF DESCRIPTION OF THE DRAWING

In the drawing, the subject-matter of the invention is represented by way of example, wherein.

DETAILED DESCRIPTION OF THE PREFERRED EMBODIMENT

Figure 2:
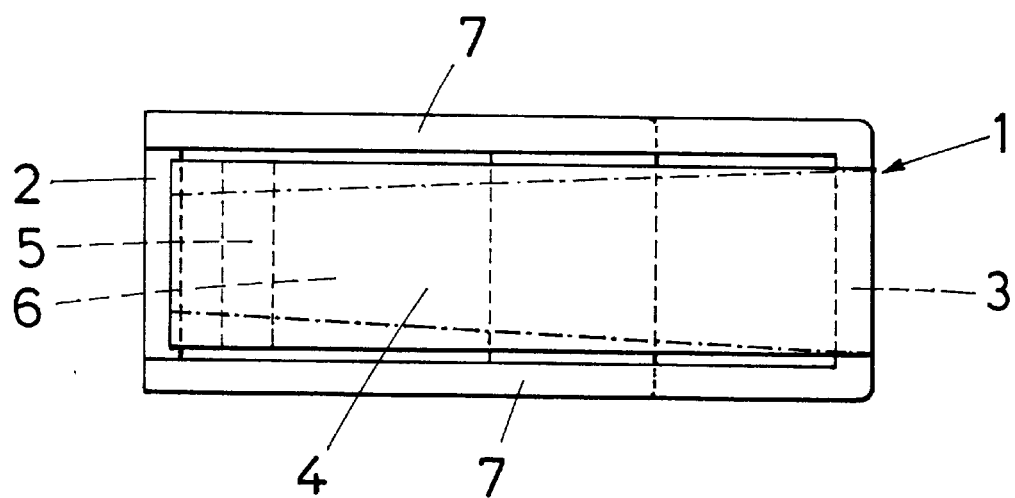

A plastic spring 1, which is injection-molded together with the spring support 2, for instance a tablet dispenser magazine, consists of a web 3 attached to the spring support 2, which web verges into a transversely extending spring tongue 4, and from which below the spring tongue 4 for instance two auxiliary spring tongues 5, 6 protrude in the same direction. The auxiliary spring tongues 5, 6 are shorter than the spring tongue 4, and the length of these auxiliary spring tongues gradually decreases with increasing distance from the spring tongue 4. In addition, the widths of the spring tongue 4 and the auxiliary spring tongues 5, 6 can taper towards the free end of the tongue, as is indicated in FIG. 2 in dash-dotted lines. To provide a rigid support, the web 3 is connected with the spring support 2 by means of lateral supporting cheeks 7, so that a kind of spring housing is formed by the supporting cheeks 7 and the web 3.

Figure 1:
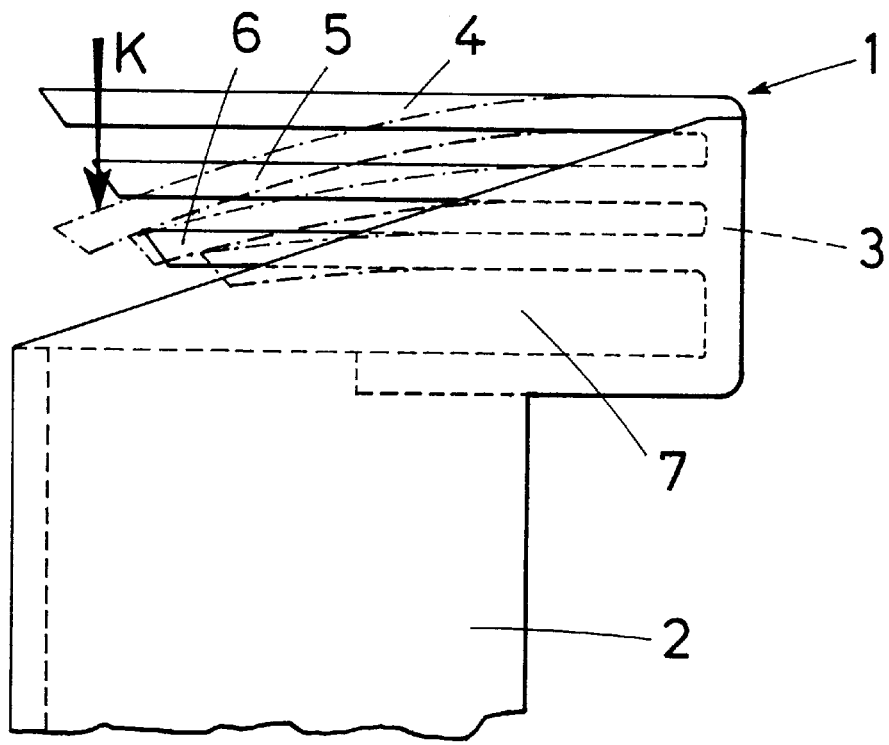
FIGS. 1 and 2 illustrate an inventive plastic spring in a schematic side view and top view, respectively.

The spring tongue 4 and the auxiliary spring tongues 5, 6 constitute a spring assembly, whose individual spring tongues progressively cooperate step by step under a load K, so that in dependence on the spring deflection an increasing spring force is achieved (dash-dotted representation in FIG. 1). It is thus possible to produce a plastic spring injection-molded from the same material as the spring support, whose spring characteristic can easily be adapted to the respective requirements as regards spring deflection and spring force.

We claim:

1. An integral plastic spring consisting essentially of
   (a) a spring support,
   (b) a web rigidly supported on the spring support,
   (c) a first spring tongue attached to the web, and
   (d) at least one auxiliary spring tongue attached to, and extending from, the web between the first spring tongue and the spring support,
      (1) the spring tongues being parallel to each other, spaced from each other for free movement in relation to each other, and extending transversely to the web.

2. The plastic spring of claim 1, wherein the spring tongues have a length decreasing towards the spring support.

3. The plastic spring of claim 1, wherein the spring tongues have a width tapering towards the free ends thereof.

4. A plastic spring consisting essentially of
   (a) a spring support,
   (b) a web rigidly supported on the spring support,
   (c) a first spring tongue attached to the web,
   (d) at least one auxiliary spring tongue extending from the web between the first spring tongue and the spring support,
      (1) the spring tongues being parallel to each other, and
   (e) lateral supporting cheeks arranged between the spring support and the web.

* * * * *